United States Patent [19]
Green et al.

[11] Patent Number: 5,687,324
[45] Date of Patent: Nov. 11, 1997

[54] METHOD OF AND SYSTEM FOR PRE-FETCHING INPUT CELLS IN ATM SWITCH

[75] Inventors: Patrick Green, Los Altos; Thomas Jefferson Runaldue, San Jose, both of Calif.; Ronald Bianchini, Jr., Pittsburgh, Pa.

[73] Assignee: Advanced Micro Devices, Inc., Sunnyvale, Calif.

[21] Appl. No.: 555,021

[22] Filed: Nov. 8, 1995

[51] Int. Cl.$^6$ ................................................. G06F 13/00
[52] U.S. Cl. ................................................. 395/250; 370/60
[58] Field of Search ...................... 370/60, 54; 395/200, 395/250

[56] References Cited

U.S. PATENT DOCUMENTS

| | | | |
|---|---|---|---|
| 4,866,701 | 9/1989 | Giacopelli | 370/60 |
| 5,287,346 | 2/1994 | Bianchini, Jr. et al. | |
| 5,313,454 | 5/1994 | Bustini et al. | 370/13 |
| 5,493,566 | 2/1996 | Ljungberg et al. | 370/60 |
| 5,497,375 | 3/1996 | Hluchyi et al. | 370/94.1 |
| 5,550,815 | 8/1996 | Cloonan et al. | 370/54 |
| 5,602,853 | 2/1997 | Ben-Michael et al. | 370/474 |

FOREIGN PATENT DOCUMENTS

| | | | |
|---|---|---|---|
| WO94/24794 | 10/1994 | WIPO | H06L 12/56 |

OTHER PUBLICATIONS

Giacomazzi P and Pattavina A., "Providing Multicast Services by the ATM Shuffleout Switch," Department of Electronics and Information Politecnico de Milano/CERFRIEL, Italy, IEEE 0-7803-1825-0/94, 1994.

Primary Examiner—William M. Treat
Assistant Examiner—Zarni Maung

[57] ABSTRACT

An ATM switch with multicast capability uses a feedback mechanism for resolving contentions. A multicast network reads N cells from an input queue, replicates multicast cells and translates their addresses in accordance with an external look-up table. The processed N cells are stored in a temporary buffer until information regarding the number (F) of cells fed back due to contention in the previous switching cycle is available. A rotator positions N-F cells from the temporary buffer on inputs of an output network so as to assign the cells from the temporary buffer a lower priority than a priority of the feed back cells. The output network selects the cells that can be switched to their destinations and transfers them to output ports. The cells that cannot be switched due to contention are fed back to be presented for the output network consideration in the next switching cycle. At the same time, a pointer of the input queue is decremented by a factor depending on the number of feedback cells, and the number of multicast and unicast cells in the current switching cycle.

18 Claims, 5 Drawing Sheets

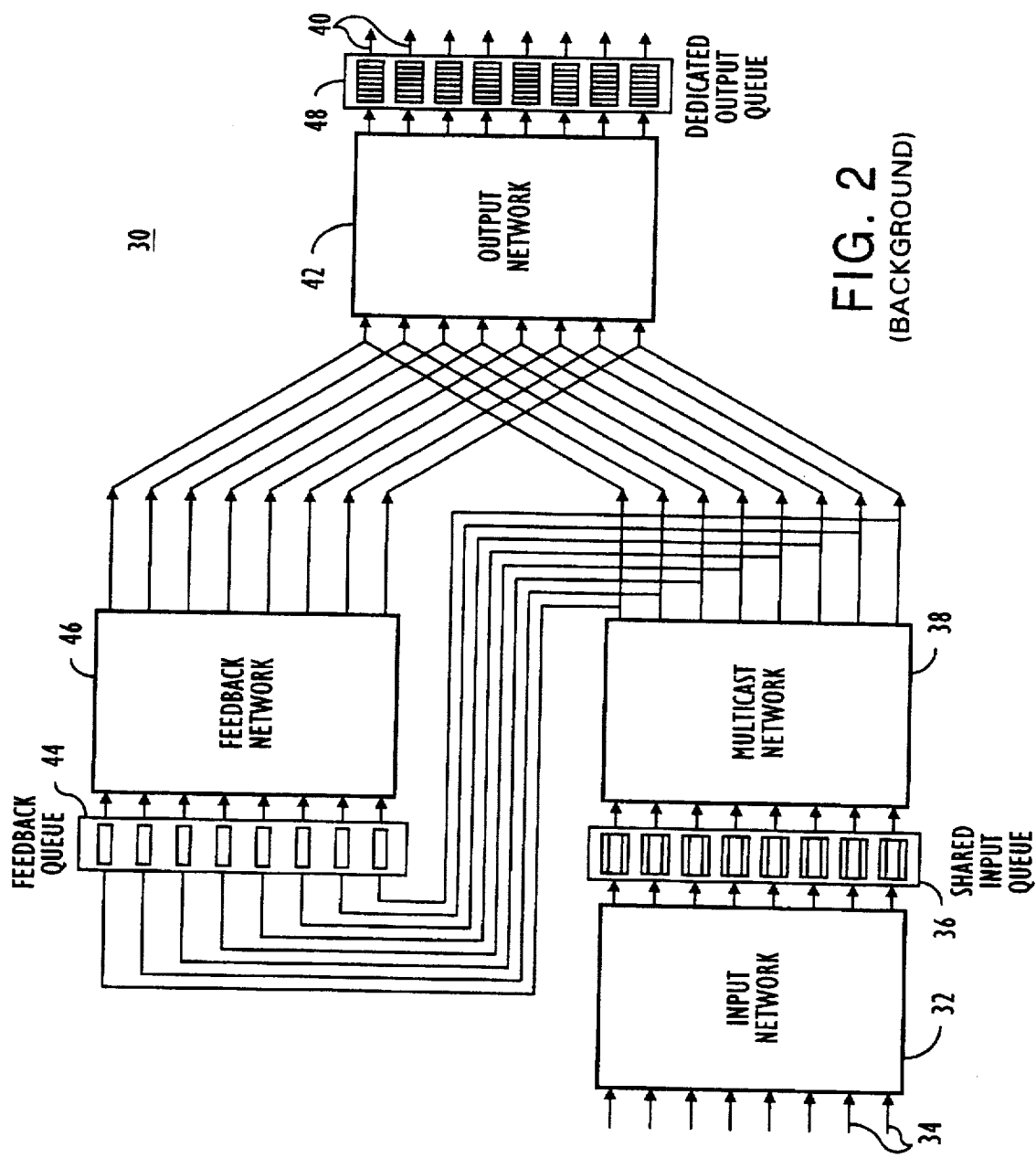
FIG. 2 (BACKGROUND)

METHOD OF AND SYSTEM FOR PRE-FETCHING INPUT CELLS IN ATM SWITCH

TECHNICAL FIELD

The present invention relates to data communication networks, and more particularly, to an asynchronous transfer mode (ATM) switch with a feedback mechanism for resolving contentions.

BACKGROUND ART

The introduction of the ATM technique is currently being propelled by the need for fast data communications in public and private networks. ATM is designed to provide the transfer mode for broadband integrated services digital network (B-ISDN) services. It supports the full gamut of multimedia at circuit speeds higher than T1 and T3 to handle voice, framed data, video and imaging. This switching technique provides multiple switched virtual circuit connections to other users through a single access to the network. Hence, ATM combines the benefits of both circuit switching and packet switching.

The ATM switch is defined by the ATM Forum and the International Telecommunication Union (ITU) Recommendations for B-ISDN that specify ATM functions, service aspects, protocol layer functions, user-to-network interface (UNI) and network-to-network interface (NNI). ATM protocol functions correspond to the first two layers of the Open System Interconnection (OSI) reference model. The ATM switch transfers user information in fixed-length packets called cells. As defined by ITU Recommendation 1.361, an ATM cell contains 48 bytes of user information and 5 bytes of control information. Referring to FIG. 1A, in an ATM UNI cell, the control part or header is composed of the 4-bit Generic Flow Control field (GFC), the 12-bit Virtual Path Identifier (VPI), the 16-bit Virtual Channel Identifier (VCI), the 3-bit Payload Type (PT) field, the Cell Loss Priority (CLP) bit, and the 8-bit Header Error Control (HEC) field. In an ATM NNI cell (FIG. 1B), the GFC field is replaced with four additional VPI bits.

The header information tells the switch which virtual channel and virtual path the cells are riding on. Each of the channel identifications are local to the multiplexer and can be changed at each switch. The combination of both the VPI and VCI establishes a node-to-node communication channel. Switch routing is then accomplished based on the VCI and VPI. The ATM switch requires a connection to be established between the incoming and outgoing virtual channels before information can be routed through the switch. Based upon the virtual channels identified within the cell header, the ATM switch will then switch and route each individual cell from the incoming multiplexed cell stream to the outgoing multiplexed cell stream. The cell sequence is maintained, and each cell is switched at the cell rate, rather than at the channel rate, to accommodate for variable bit rate transmissions.

The GFC field is used when a single user access point provides services for multiple terminal interfaces, such as those found in a local area network (LAN) environment, to ensure that each terminal will get equal access to the shared network bandwidth. The PT field discriminates between a cell carrying user information and service information in the information field. The CLP field defines a level of semantic priority to allow users or network providers to choose which cells to discard during periods of network congestion. The HEC field provides error checking for the first four header bytes.

When the cells are sent to the ATM switch, they are placed into a queue until they can be multiplexed asynchronously with other cells for transmission. A time slot is allocated only to channels that have data for transmission. The switch adapts the incoming bit rate to the transmit channel rate, inserting dummy cells when needed to achieve the aggregate bit stream rate (e.g. 155.52 Mbps). The remote switch delineates the good cells from the dummy cells based on header information.

FIG. 2 shows an ATM switch 30 having multicast capability that allows a cell to be broadcast to multiple destinations in the network. The switch 30 comprises an input network 32 having N input ports 34 for receiving cells. The received cells are transferred through the input network 32 so as to place them in desired locations of an input buffer 36 for storing a shared input queue. The received cells may be addressed to a single destination (unicast cells) or to multiple destinations (multicast cells). A multicast network 38 receives the unicast and multicast cells from the shared input queue, decodes the multicast cells, and replicates them to provide a copy for each multicast destination. An external look-up table is provided to store destination address data used for replacing address data of the multicast cells supplied to the multicast network 38. The multicast network 38 translates the input address of each multicast cell copy into a destination address found in the look-up table, and transfers the copies, together with the unicast cells to its outputs. However, at most one cell from the outputs of the multicast network 38 may be routed to each output port 40 via an output network 42. To prevent congestion, additional cells destined for each output port 40 are transferred from the outputs of the multicast network 38 to a feedback buffer 44. Via a feedback network 46, the feedback cells are transferred to the output network 42 on the next cell cycle. The feedback network 46 supplies the feedback cells to the top of the output network 42 to assign them a higher priority with respect to the cells supplied directly from the multicast network 38. The output network 42 is arranged so as to provide a top-to-bottom priority at its inputs. For example, the cell at its top input has a priority higher that the cell at its next to the top input which, in turn, has a priority higher that the cell at the lower input. The output network 42 transfers the cells from its inputs to an output buffer 48 for storing a dedicated output queue. A dedicated output queue, one at each input port, allows the ATM switch rate to be speeded up by a speed-up factor, for example, by four times. The speeding up is achieved by storing several cells destined for each output port in the Output Queue 48.

Banyan or Omega networks, used in a non-blocking mode, may be used as the input network 32, multicast network 38, and feedback network 42. The output network 42 may be a non-blocking switching network such as a crossbar network. For N inputs and N outputs, addressed from 0 to N−1, each Banyan or Omega network contains $\log_2 N$ stages of 2×2 switching elements. Routing through the network is accomplished by using the destination address of each cell supplied to its input. Each stage of the network is responsive to a single bit of the destination address for forwarding the cell to its corresponding output. For example, if the most significant bit of the destination address is "1", the first stage switches the cell to its "1" output. Then, the most significant bit is removed, and the procedure is repeated by the next stage. The structure and operation of the elements shown in FIG. 2 are disclosed in more detail in U.S. Pat. No. 5,287,346 incorporated herewith by reference.

As described above, the multicast/feedback path that combines the multicast and feedback networks 38 and 46 carries out several multicast and feedback operations on every cell. In particular, the multicast operations involve an external address look up performed on every multicast cell. The feedback operations include control information transferred from the output network 42 to the multicast network 38 to resolve contention at the input of the output network 42. To perform these operations separate clock cycles are required. However, to provide interaction between multicast and feedback operations performed on every cell, they should be accomplished within one cell time equal approximately to 2.7 μs at 155 Mbps. As the number of ports increases (e.g. up to 256) more operations are required to be performed by the multicast/feedback path within the cell time. Hence, there is a need for increasing the number of clock cycles available for the multicast/feedback path within a fixed amount of time. A conventional solution would be to increase the bus width to external components such as SRAM and switch controllers. Also, a faster more expensive SRAM could be used to gain more clock cycles, or inter-chip signalling could be run at much higher frequencies with special line conditioning. However, the cost of implementing these solutions is prohibitly high.

A feature of the present invention is to break up the multicast/feedback timing into two sub-cycles and to perform a cell pre-fetch operation at the output of the shared input queue. As a result, the multicast operation could be separated from the feedback operation. By contrast, the ATM system in FIG. 2 must wait until the contention at the input of the output network 42 is resolved, to perform an external look-up operation for a multicast cell. Thus, the multicast and feedback operations are carried out sequentially. As a result, the number of ports that can be accommodated by this ATM system is limited. However, it would be desirable to enable an ATM switch to carry out these operations independently and simultaneously, in order to provide the multicast/feedback path with additional clock cycles required as the number of ports expands.

DISCLOSURE OF THE INVENTION

Accordingly, one advantage of the invention is in providing an ATM switch that carries out multicast and feedback operations independently and simultaneously.

Another advantage of the invention is in providing a system for pre-fetching input cells in an ATM switch to increase a number of clock cycles available for multicast/feedback path within a fixed period of time.

Further advantage of the invention is in providing an inexpensive means for providing an ATM switch with additional clocks cycles required as the number of ports expands.

The above and other advantages of the invention are achieved, at least in part, by providing a data communications system for transferring packets, for example ATM cells, between a plurality of input and output ports. An input buffer is used for accumulating the packets received by the input ports. A distribution network, for example a multicast network, reads N packets from the input buffer and provides them with destination address data. An output network is used for transferring the packets supplied by the distribution network to the output port. The output network has a contention resolving mechanism for rejecting a number of the received N packets to prevent the rejected packets from passing to the output ports. In response to the contention resolving mechanism, a feedback network receives the packets rejected in a current cycle of operations to supply them to the output network in a next cycle of operations. A temporary buffer is coupled between the distribution network and the output network for storing the received N packets until the number of the rejected packets is determined.

In accordance with one aspect of the invention, a rotating network is coupled between the temporary buffer and the output network for modifying contention priority of the packets from the temporary buffer depending on the number F of the rejected packets. The rotating network presents N–F packets from the temporary buffer to the output network in response to a control signal from the feedback network.

In accordance with another aspect of the invention, a higher input of the output network is assigned with a higher priority than a lower input, and the packets from the temporary buffer are supplied at lower inputs of the output network than the rejected packets.

In accordance with a further aspect of the invention, a sequence of the received packets in the input buffer is modified depending on the number of the rejected packets, and the number of received multicast packets.

In accordance with a method of the present invention, the following steps are carried out:

(a) in a current switching cycle of a packet switch, reading packets from the input buffer for processing by the multicast network, (b) loading the processed packets into the temporary buffer, (c) determining the number of feedback packets in the feedback path rejected by the output network in a switching cycle previous to the current switching cycle, (d) transferring the packets from the temporary buffer to the output network, through the rotator network, (e) transferring the feedback packets rejected in the previous switching cycle to the output network, (f) transferring the packets from the temporary buffer and the feedback packets through the output network to the output ports in accordance with a contention resolving algorithm, and (g) supplying the packets rejected by the output network to the feedback path for presenting to the output network in a next switching cycle.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

FIG. 2 is a block diagram of a conventional ATM switch.

BEST MODE FOR CARRYING OUT THE INVENTION

Although the invention has general applicability in the field of data communications, the best mode for practicing the invention is disclosed based on an exemplary feedback ATM switch with multicast capability shown in FIG. 2. However, it should be understood that the invention is applicable to any data network with a feedback means for resolving contentions.

Figure 1A:
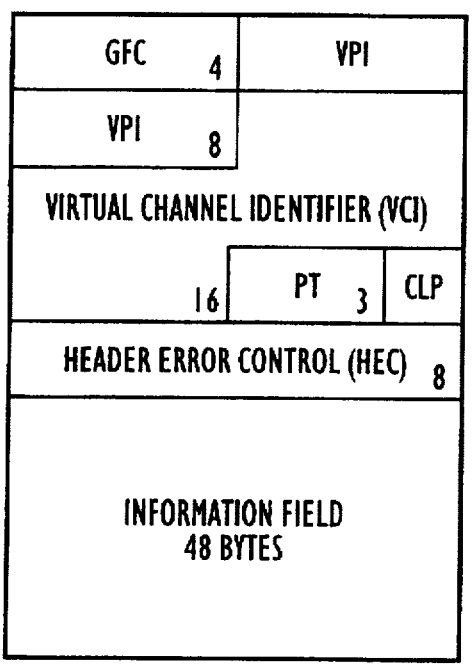
FIGS. 1A and 1B respectively illustrate formats of UNI cells and NNI cells.
Figure 1B:
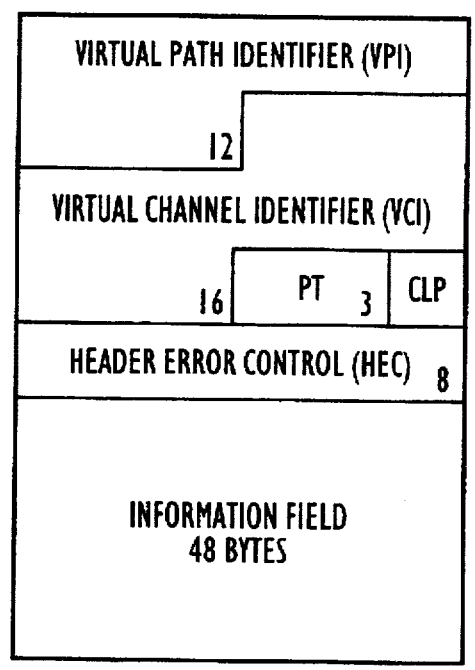
Figure 3:
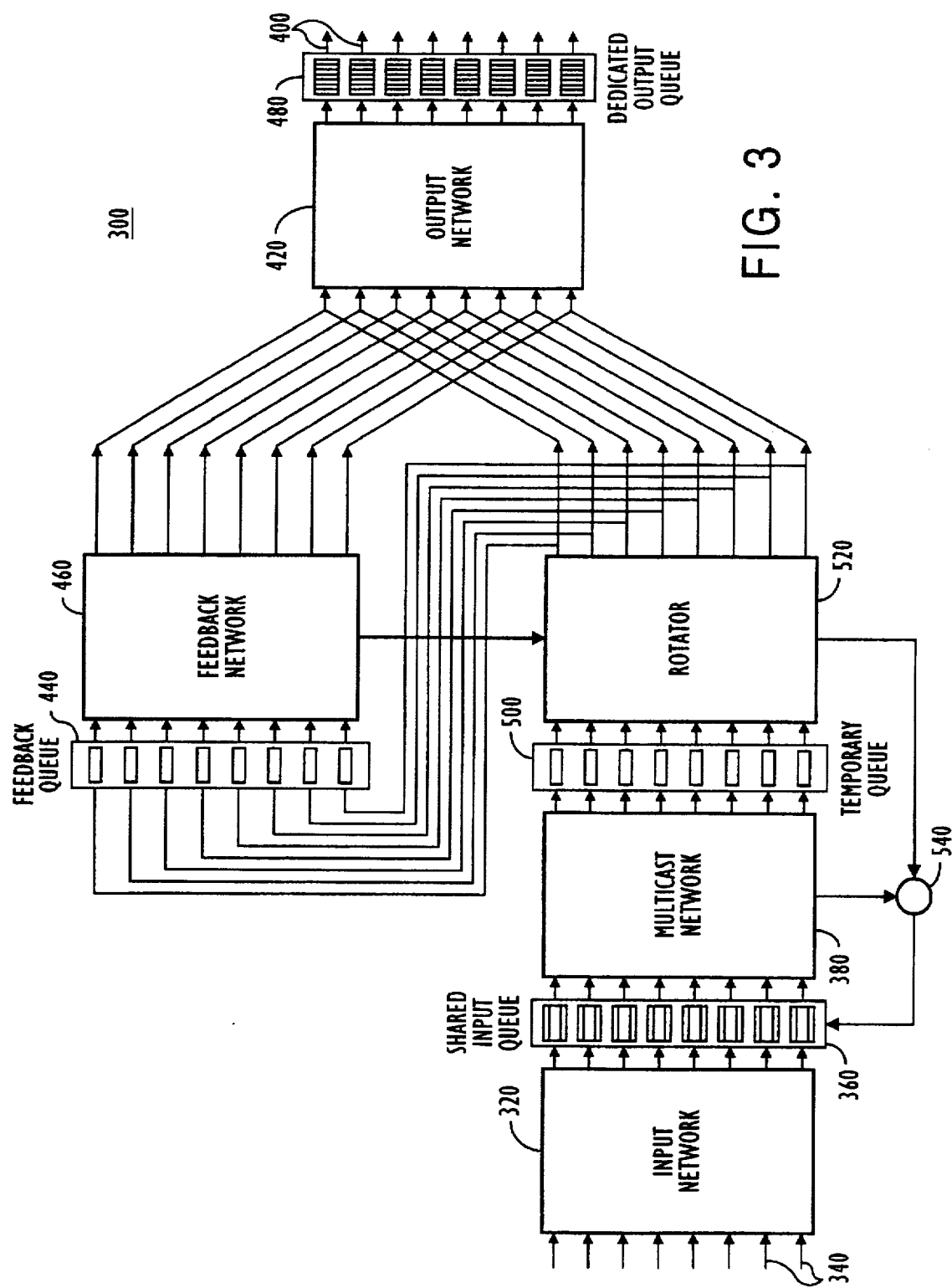
FIG. 3 is a block diagram of an ATM switch in accordance with the invention.

Referring to FIG. 3, an ATM switch 300 comprises an input network 320 coupled to N input ports 340 for receiving unicast and multicast cells. Via an input buffer 360, the input network 320 is connected to a multicast/feedback path that comprises a multicast network 380 and a feedback network 460 coupled to a feedback buffer 440. An output network 420 and a output buffer 480 serve for transferring cells to output ports 400. The structure of the input, multicast, feedback and output networks, and the input, feedback and output buffers may be basically similar to the structure of the corresponding elements shown in FIG. 2.

Further, the ATM switch 300 contains a temporary buffer 500 coupled to the outputs of the multicast network 380, and a rotator 520 that interfaces the temporary buffer 500 with the output network 420. The temporary buffer may be any random-access memory capable of storing N cells, where N corresponds to a number of input ports 340. Preferably, the rotator 520 is a Banyan or Omega network, used in a non-blocking mode that contains $\log_2 N$ stages of 2×2 switching elements. The temporary buffer 500 and the rotator 520 will be discussed in more detail later.

Figure 4:
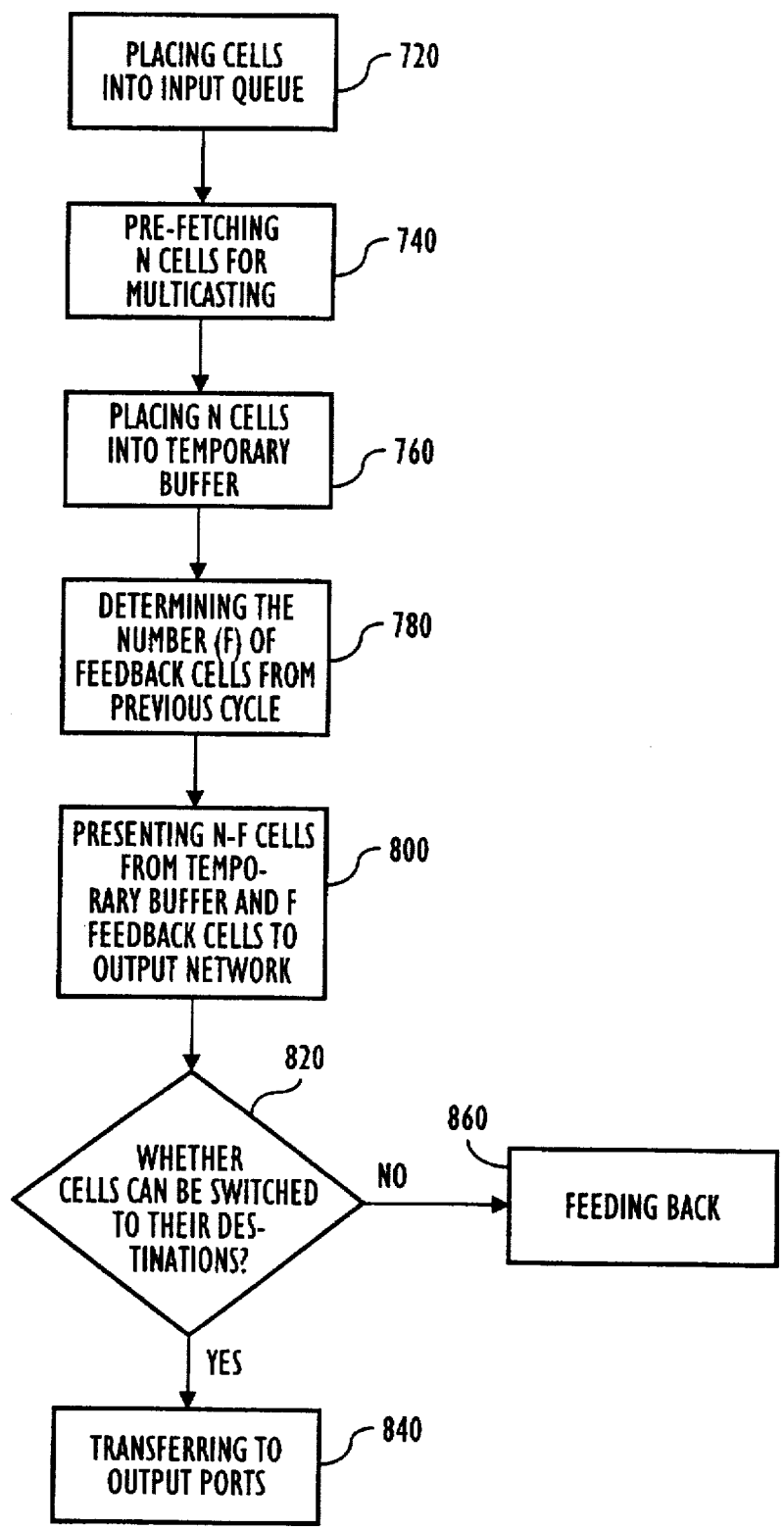
FIG. 4 is a flow chart illustrating a cell switching procedure in accordance with the invention.

Referring to FIG. 4, the received cells are placed by the input network 320 into an input queue shared by all input ports 340 (block 720). The shared input queue are stored in the input buffer 360. In a pre-fetch cycle (block 740), the multicast network 380 pops all N cells from the shared input queue, and performs its operations on these cells.

The N cells may be unicast cells, a mixture of multicast and unicast cells, or multicast cells. The unicast cells are transferred to the outputs of the multicast network 380 that correspond to their destination addresses. The multicast cells are replicated to provide a separate copy for each destination. The multicast network 380 accesses an external look up table for the destination address of each multicast cell using the input address data of the multicast cell as an index. Then, the found destination address is attached to each copy to allow the multicast network 380 to route the copy towards the corresponding output. When a unicast cell or a copy of a multicast cell reaches the output of the multicast network 380, it is placed into a temporary buffer 500 that allows all N cells to be stored (block 760).

Simultaneously with the multicast operations on the cells received in the current cycle, the feedback network 460 performs the feedback operations on the cells received in the previous cycle. The output network 420 is provided with a contention resolving mechanism that allows up to four cells to from the combined sources of the multicast/rotator 520 and the Feedback Network 460 to be sent to the Dedicated Output Queue 480. The Dedicated Output Queue 480 provides a mechanism to sent only one cell to each output port 400. Remaining cells which were not accepted by the Output Network 420 are fed back. They are placed into the feedback buffer 440, and transferred to the output network 420 via the feedback network 460 on the next switch cycle. The feedback cells are assigned with a higher priority than the cells received in the current cycle.

Due to the feedback cells, not all N cells from the temporary buffer 500 can pass to the output queue 480. The cells are stored in the temporary buffer 500 until the feedback network 460 indicates the number of the cells fed back during the previous cycle (block 780). When the rotator 520 receives information that F cells were fed back in the previous cycle, it reads N–F cells from the temporary buffer 500 to move them to the output network 420 (block 800). The cells remaining in the temporary buffer 500 are discarded and will be overwritten by the cells transferred from the shared input queue 360 in the next cycle.

Thus, the output network 420 is presented with up to N cells for consideration. The output network 420 uses the contention resolution mechanism to determine which cells can be switched to their appropriate outputs (block 820), and transfers them to the output ports 400 (block 840). Those cells that cannot pass to the output ports 400 due to contention, are fed back to the feedback buffer 440, for transmitting during the next cycle (block 860).

To prevent losing cells remaining in the temporary buffer, the rotator 520 supplies the input buffer 360 with a signal indicating the number of feedback cells, to modify the shared input queue so as to repeat the transfer of cell discarded in the prior cycle. The input buffer 360 also receives a signal from the multicast network 380 indicating the number of multicast and unicast cells. The multicast network 380 and the rotator 520 communicates with the input buffer 360 through pointer manipulation logic 540.

The input buffer 360 contains top and bottom memory pointers that respectively indicate the addresses of the oldest packet in the shared input queue and the next available element in the queue. For example, when the T oldest packets in the queue are removed, the top pointer is incremented by T. When R of these T packets are fed back due to contention at the output ports 400, the top pointer should be decremented by R to maintain the input queue order.

When the input buffer 360 receives the indicating signals from the multicast network 380 and the rotator 520, the top pointer is decremented by a factor depending on the number of feedback cells, and the number of multicast and unicast cells in the current cycle. As soon as the top pointer has been modified, a new pre-fetch cycle is commenced, and the above-disclosed procedure repeats.

As noted above, the feedback cells must have a higher priority than the cells transferred from the temporary buffer 500. As the output network 420 is arranged so as to provide a top-to-bottom priority at its inputs, the rotator 520 positions the cells read from the temporary buffer 500 at the inputs of the output network 420 immediately below the inputs assigned to the feedback cells supplied from the feedback network 460.

Figure 5:
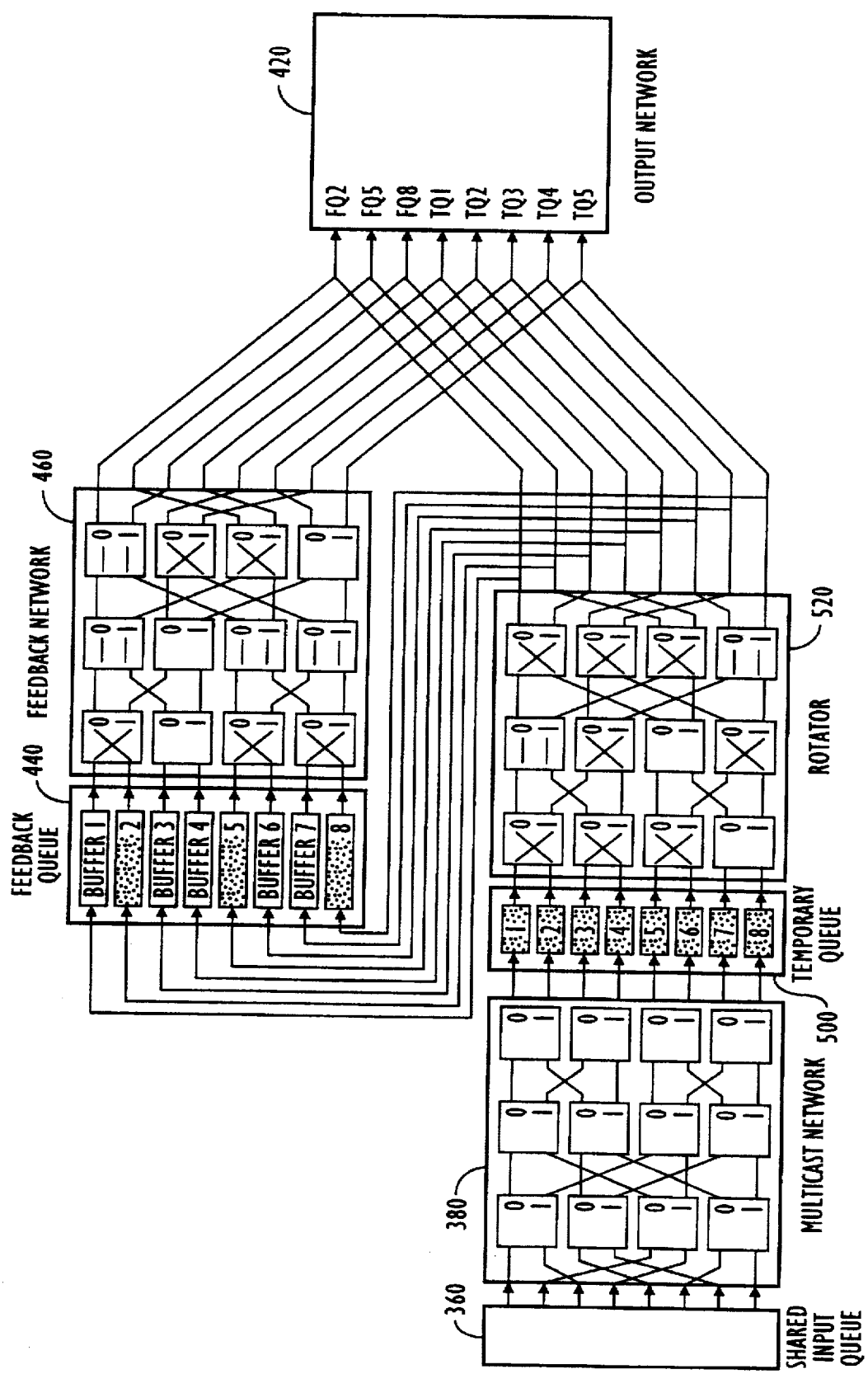
FIG. 5 is a diagram showing an example of interaction between elements of the ATM switch shown in FIG. 3.

The interaction between the rotator 520 and the feedback network 460 is illustrated using an example shown in FIG. 5. In this example, temporary queue sections 1–8 of the temporary buffer 500 are loaded with 8 cells provided by the multicast network 380 in the current switching cycle of the ATM switch 300. The feedback buffer 440 holds 3 cells from the previous cycle in its sections 2, 5 and 8. A first-in-first-out (FIFO) register having one cell capacity may be used as each of the temporary buffer and feedback buffer sections 500 and 440. When the feedback network 460 informs the rotator 520 that 3 cells are in the feedback path, the rotator 520 reads the cells from the temporary buffer sections 1–5 to position them on inputs TQ1–TQ5 of the output network 420 below top three inputs FQ2, FQ5 and FQ8 respectively assigned to the cells from sections 2, 5 and 8 of the feedback buffer 440. The cells in temporary buffer sections 6, 7 and 8 are discarded. However, the cells stored there are not lost because the rotator 520 decrements the top pointer of the shared input queue so as to request the input buffer 500 to send these cells again in the next switching cycle.

The feedback network 460 and the rotator 520 contain 2×2 switching elements connected to implement the standard routing procedure in accordance with the Banyan algorithm. This procedure is disclosed, for example, in U.S. Pat. No. 5,287,346 incorporated herein by reference. The N switching elements route the cells read from the temporary and feedback buffers to the required inputs of the output network 420. During a contention resolving procedure, a cell at a higher input of the output network 420 has a priority with respect to a cell at its lower input. In the disclosed example, the rotator 500 moves the cells applied to its inputs down by 3 lines, in order to assign them a priority lower than the priority of the feedback cells.

Thus, the pre-fetching procedure makes the multicast and feedback operations independent from each other. While in the system shown in FIG. 2, the multicast network cannot commence time-consuming external look-up procedures for multicast cells until feedback operations are completed, with the arrangement and method of the present invention the look-up operations are performed simultaneously with the feedback operations.

There accordingly has been described an ATM switch with multicast capability having a feedback mechanism for resolving contentions. A multicast network reads N cells from an input queue, replicates multicast cells and translates their addresses in accordance with an external look-up table. The processed N cells are stored in a temporary buffer, until information regarding the number (F) of the cells fed back due to contention in the previous switching cycle is available. A rotator reads N–F cells from the temporary buffer and positions them on inputs of an output network so as to assign them a lower priority than the priority of the feedback cells presented to the output network by a feedback network. The output network selects the cells that can be switched to their destinations and transfers them to output ports. The cells that cannot be switched due to contention are fed back to be presented for the output network consideration in the next switching cycle. At the same time, a pointer of the input queue is decremented by a factor depending on the number of feedback cells, and the number of multicast and unicast cells in the current switching cycle.

Accordingly, the disclosed arrangement and method allows the ATM switch to carry out the multicast and feedback operations simultaneously and independently to provide extra clock cycles required as the number of ports expand.

In this disclosure, there are shown and described only the preferred embodiments of the invention, but it is to be understood that the invention is capable of changes and modifications within the scope of the inventive concept as expressed herein.

We claim:

1. A data communications system for transferring packets between a plurality of input and output ports, comprising:
    an input buffer for accumulating the packets received by the input ports,
    a distribution network for pre-fetching N packets from said input buffer and providing them with destination address data in a current cycle of operations,
    an output network for transferring to said output ports the packets supplied by said distribution network and having a contention resolving mechanism for rejecting a number of said N packets to prevent the rejected packets from passing to the output ports,
    a feedback network responsive to said contention resolving mechanism for providing feedback operations to receive the packets rejected in a previous cycle of operations and supply said rejected packets to said output network in the current cycle of operations, and
    a temporary buffer coupled between said distribution network and said output network for storing the N packets with the destination address data from said distribution network until the number of said rejected packets is determined to enable said distribution network to perform distribution operations independently from the feedback operations.

2. The system of claim 1, further comprising a rotating network coupled between said temporary buffer and said output network for modifying contention priority of the packets from the temporary buffer depending on the number F of said rejected packets.

3. The system of claim 2, wherein said rotating network presents N–F packets from said temporary buffer to said output network in response to a control signal from said feedback network.

4. The system of claim 2, wherein a higher input of the output network is assigned with a higher priority than a lower input, and the packets from said temporary buffer are supplied at lower inputs of said output network than the rejected packets.

5. The system of claim 2, wherein said input buffer stores a sequence of the received packets modified in response to a control signal from said rotating network.

6. The system of claim 2, wherein said rotating network comprises a Banyan network.

7. The system of claim 2, when said temporary buffer comprises FIFO memories.

8. The system of claim 2, wherein said feedback network comprises a feedback buffer for storing said rejected packets.

9. The system of claim 1, wherein said packets comprise ATM cells.

10. The system of claim 1, wherein said distribution network decodes the received packets to detect a multicast packet, replicates the multicast packet to provide a copy for each destination of the multicast packet and interacts with an external look-up table to provide the copy with address information.

11. In a packet switch having an input buffer coupled to input ports, a multicast network coupled to the input buffer, a temporary buffer coupled to the multicast network, an output network coupled between the temporary buffer and output ports, and a feedback path coupled to the output network to transport data rejected by the output network due to contention, a method of transferring packets between the input ports and the output ports comprising the steps of:
    (a) in a current switching cycle, pre-fetching packets from the input buffer for processing by the multicast network,
    (b) loading the processed packets into the temporary buffer,
    (c) determining the number of feedback packets in the feedback path rejected by the output network in a switching cycle previous to the current switching cycle,
    (d) transferring the packets from the temporary buffer to the output network, the temporary buffer storing the packets until the number of the feedback packets rejected in the previous switching cycle is determined,
    (e) transferring the feedback packets rejected in the previous switching cycle to the output network,
    (f) transferring the packets from the temporary buffer and the feedback packets through the output network to the output ports in accordance with a contention resolving algorithm, and (g) supplying the packets rejected by the output network into the feedback path for presenting to the output network in a next switching cycle.

12. The method of claim 11, wherein said step (d) comprises assigning to the packets from the temporary buffer a priority lower than a priority of the feedback packets.

13. The method of claim 12, wherein a first group of inputs of the output network have a higher priority than a second group of inputs, and said step of assigning a priority to the packets comprises transferring the packets from the temporary buffer to the second group of inputs and transferring the feedback packets to the first group of inputs.

14. The method of claim 11, wherein step (b) comprises loading N packets into the temporary buffer, step (c) comprises determining that F packets were rejected in the previous switching cycle, and step (d) comprises transferring N–F packets to the output network.

15. The method of claim 11, wherein a packet sequence stored in the input buffer is modified depending on the number of the feedback packets.

16. The method of claim 15, wherein the packet sequence is further modified depending on the number of multicast packets supplied to the multicast network.

17. An ATM network for switching cells between input and output ports, comprising:

an input buffer coupled to the input ports for storing an input cell queue, a multicast network coupled to the input buffer for prefetching multicast and unicast cells from the input cell queue to provide the multicast cells with destination data in a current switching cycle, an output network coupled between the multicast network and output ports for resolving contention between the cells and having first and second groups of inputs, the cells supplied to the first group of the inputs having a contention priority higher that the cells supplied to the second group of the inputs, a feedback path coupled to said output network for transferring cells rejected by said output network due to the contention in a previous switching cycle to present the rejected cells onto the first group of the inputs in the current switching cycle, a temporary buffer coupled to the multicast network for storing the cells with the destination data until the number of said rejected cells is determined, in order to enable said multicast network to provide the cells with the destination data independently from feedback operations in said feedback path, and a rotator coupled to said temporary buffer for transferring the cells read from the temporary buffer to the second group of the inputs.

18. The ATM network of claim 17, wherein said rotator reads the cells from the temporary buffer in response to information from said feedback path indicating the number of the cells rejected in a previous switching cycle.

* * * * *